United States Patent [19]

Krufka

[11] Patent Number: 4,594,684

[45] Date of Patent: Jun. 10, 1986

[54] SYSTEM AND METHOD FOR MEASURING THE AREA AND DIMENSIONS OF APERTURES IN AN OPAQUE MEDIUM

[75] Inventor: Frank S. Krufka, Mount Joy, Pa.

[73] Assignee: RCA Corporation, Princeton, N.J.

[21] Appl. No.: 768,749

[22] Filed: Oct. 2, 1985

Related U.S. Application Data

[62] Division of Ser. No. 572,150, Jan. 19, 1984, Pat. No. 4,556,902.

[51] Int. Cl.⁴ .............................................. G06F 3/037
[52] U.S. Cl. ................................................ 364/900
[58] Field of Search ... 364/200 MS File, 900 MS File; 358/37

[56] References Cited

U.S. PATENT DOCUMENTS

| Re. 31,200 | 4/1983 | Sukonick et al. | 364/900 X |
| 4,070,710 | 1/1978 | Sukonick et al. | 364/900 |
| 4,229,797 | 10/1980 | Ledley | 358/37 |
| 4,471,463 | 9/1984 | Mayer et al. | 364/900 |

Primary Examiner—Harvey E. Springborn
Attorney, Agent, or Firm—E. M. Whitacre; D. H. Irlbeck; T. H. Magee

[57] ABSTRACT

An interface circuit in a television receiver selects two pulses from a pulse train for transfer to a digital computer. The interface circuit includes first and second logic elements, a counter and a comparator for enabling a gating circuit to transfer the selected two pulses to the digital computer.

4 Claims, 7 Drawing Figures

SYSTEM AND METHOD FOR MEASURING THE AREA AND DIMENSIONS OF APERTURES IN AN OPAQUE MEDIUM

This is a division, of application Ser. No. 572,150, filed Jan. 19, 1984, now U.S. Pat. No. 4,556,902.

BACKGROUND OF THE INVENTION

This invention relates generally to the measurement of the area of apertures in an opaque medium and particularly to the measurement of the area and dimensions of the slits in a kinescope shadow mask.

Kinescopes for color television receivers typically contain a shadow mask which serves as a color-selection electrode. The shadow mask is made of thin metal and contains a plurality of apertures, typically in the form of substantially rectangular slits. The apertures are arranged in a systematic pattern and are useful in assuring that the three electron beams of the kinescope impact phosphor which emit the proper colors of light. The apertures are placed into the shadow mask material by acid etching. The shadow mask material is coated on both sides with a photoresist material. The aperture pattern is then photographically produced on both sides of the material by exposure to light. The unexposed photoresist material is then washed away and to leave bare metal which is subsequently etched away in an acid tank to form the apertures.

A knowledge of the area and dimensions of the etched apertures is desirable for several reasons. For example, the desired optimum area of the apertures is known and, accordingly, a substantial deviation from the desired area can be indicative of the need to correct one or more parameters of the shadow mask fabrication processes. Additionally, shadow masks which have apertures within a permissible range of tolerances are grouped into categories in accordance with the area of the apertures for automatic processing purposes. Prior art efforts at measuring aperture areas have measured the ability of the shadow mask to pass light. Thus a known intensity of light is used to illuminate the shadow mask and the intensity of light passing through the apertures is taken as a measure of the area of the apertures. This technique is unacceptable because acceptable readings can be obtained from unacceptable aperture. For example, the apertures can be too wide and too short for acceptable tube operation but still have an area equal to that of dimensionally acceptable apertures. For these reasons, there is a need for a system for accurately measuring the average area and dimensions of the apertures etched into shadow masks. The instant invention fulfills this need.

SUMMARY

A system for measuring the average area and dimensions of apertures in an apertured member includes an energy source for passing energy through the apertures. A camera having an array of pixels responsive to the energy and a lensing arrangement selectively scans the energy in a plurality of scan lines over the pixels whereby the pixels are charged to one level when the energy passes through an aperture and to another level when the energy is blocked by the material between the apertures. The camera is rotatable with respect to the apertured member whereby the apertures are scanned in orthogonal first and second directions. Apparatus responsive to the charge levels provides an analog signal having first and second voltage levels respectively indicative of the first and second charge levels. A connecter receives the analog signal and provides a digital signal representative of the analog signal. A apparatus responsive to the digital signal stores the digital signal for each of the scan lines as a row and the digital signals for successive scan lines as columns. The pulse width of every pulse in one of the columns is added to obtain a first total pulse dimension when scanning occurs in the first direction. The first total pulse dimension is divided by a preselected number to obtain a first typical pulse dimension. The pulse width of every pulse in another of the columns is added to obtain a second total pulse dimension when scanning occurs in the second direction. The second total pulse dimension is divided by a preselected number to obtain a second typical pulse dimension. The first and second typical pulse dimensions are multiplied to obtain a typical aperture area.

DETAILED DESCRIPTION

Figure 1:
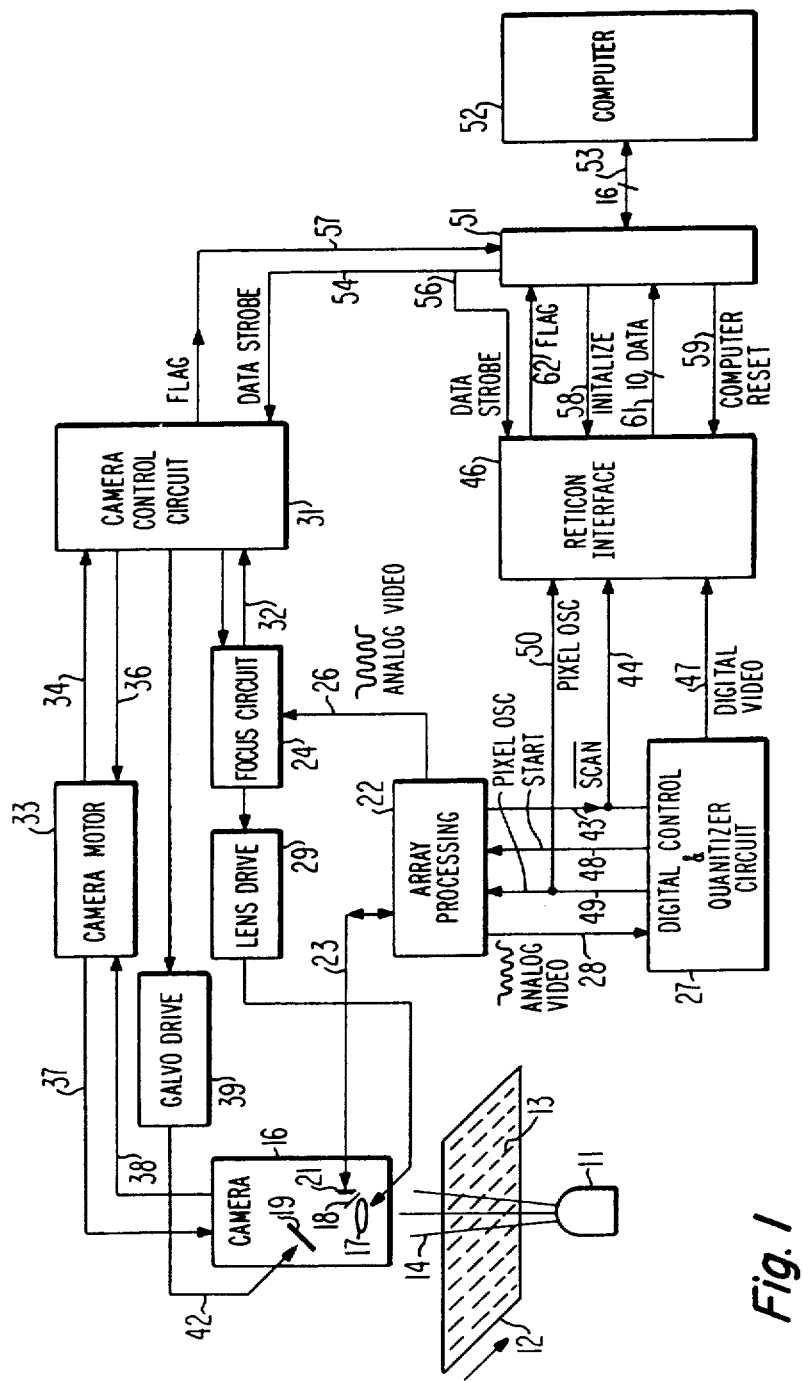
FIG. 1 is a block diagram of a system for measuring the average area and dimensions of apertures in an opaque medium.

In FIG. 1, a light source 11 illuminates a shadow mask 12 containing a plurality of apertures 13, typically in the form of substantially rectangular slits, the average area and dimensions of which are to be measured. The light rays 14 are received by a camera 16 which includes a focusing lens 17, a fixed mirror 18, a scanning galvo mirror 19 and a photodiode array 21. The photodetector array 21 can be an H-series model 1728 photodetector available from EG&G Recticon and as such has 1728 pixels which are individually responsive to light energy. Thus, as the light rays 14 pass through the apertures 13 within the shadow mask 12, the pixels of the photodetector array 21 which receive light from the apertures are charged to one level while those which coincide with the opaque material between the apertures 13 are charged to a different level. The energy levels from the individual pixels of the photodetector array 21 are fed to an array processing circuit 22 by a line 23. The array processing circuit 22 is supplied by the vendor of the photodetector array. The array processing circuit 22 provides an analog video signal to a focus circuit 24 over a line 26 and also to a digital control and quantizing circuit 27 over a line 28. The digital control and quantizing circuit 27 converts the analog video signal into a digital signal and also quantizes the analog signal at the 50% level. The details of this circuit, therefore, are within the purview of one skilled in the art. The output of the focus circuit 24 is provided to a lens drive 29 and to a camera control circuit 31 over a line 32. The camera control circuit 31 communicates with a camera motor 33 by way of lines 34 and 36. The camera motor 33 is used to rotate the camera 16 90° and is coupled to the camera 16 by way of lines 37 and 38. Additionally, the camera control circuit 31 actuates a galvo drive 39 by way of a line 41. The galvo drive 39 is coupled to the galvo mirror 19 of the camera 16 by a line 42. The focus circuit 24, lens drive 29, camera control circuit 31, camera motor 33, and the galvo drive 39 also are within the purview of one skilled in the art and the details are not required herein.

The array processing circuit 22 provides a $\overline{\text{scan}}$ output signal to the digital control quantizing circuit 27 by way of a line 43. The $\overline{\text{scan}}$ signal also is provided to a Reticon interface circuit 46 by way of a line 44. The details of the Reticon interface 46 are described hereinafter with reference to FIG. 2. The digital control and quantizing circuit 27 provides a digital video signal to the Reticon interface 46 by way of the line 47. The digital control and quantizing circuit 27 also provides a start signal and a pixel oscillator signal to the array processing circuit 22 by way of lines 48 and 49 respectively. The pixel oscillator signal also is applied to the Reticon interface circuit 46 by a line 50.

The Reticon interface 46 communicates with a computer interface 51 which in turn communicates with a computer 52 by way of a 16 conductor cable 53 which serves as the control and data lines between the interface 51 and the computer 52. The computer can be a model HP9836 available from Hewlett Packard and the interface 51 can be a HP6940B also available from Hewlett Packard. The interface 51 provides a data strobe signal to the camera control circuit 31 by way of a line 54 and to the Reticon interface 46 by way of a line 56. The camera control circuit 31 provides a flag signal to the computer interface 51 by way of line 57. The computer interface 51 provides an initialize signal and a computer reset signal to the Reticon interface 46 by way of lines 58 and 59, respectively. The Reticon interface 46 provides data inputs to the computer interface over a 10-conductor busbar 61. The Reticon interface also provides a flag signal to the computer interface 51 over a line 62.

In operation, the shadow mask 12 is placed between the light source 11 and camera 16 and is illuminated to charge the pixels of the array 21 in accordance with the light energy impacting on the individual pixels. The focus circuit 24 and lens drive 29 are used to focus the camera to optimize the image cast upon the array. The light rays 14 are focused through the lens 17 and reflected by the mirror 18 to the galvo mirror 19 to scan one line across the array. The lens 17 also magnifies the image so that each of the slits 13 is imaged onto a plurality of pixels in the photodetector array 21. The charge level signals are provided to the array processing circuit 22 which, in turn, provides an analog video signal to the digital control and quantizing circuit 27. A digital video signal is provided to the Reticon interface by the output line 47 of the digital control and quantizer circuit 27. The Reticon interface 46 provides a 10-bit data number which represents the pixel count for the digital video signal received from the digitial control and quantizing circuitry 27. This 10-bit data word is stored in the computer 52. The camera control circuit 31 provides a signal to the galvo drive 39 to slightly rotate the galvo mirror 19 so that each scan is effectively moved to a different position on the shadow mask 12. The scanning and storage is repeated for a preselected number of scan lines, such as 100, for example. The Reticon interface circuit 46 manipulates the digital video signal such that data from only the first two apertures 13 scanned in each scan line are provided to the computer 52. This is explained hereinafter with reference to FIG. 2.

After the preselected number of scans is made in the first direction, the camera control circuit 31 actuates the camera motor 33 to rotate the camera 16 90° with respect to the shadow mask 12. The appropriate focusing of the camera is repeated and the photodetector array 21 is again scanned for the preselected number of lines. However, because the camera has been rotated, the scanning direction is orthogonal to the original scanning direction and the other dimensions of the rectangular slits 13 is measured.

The data received during scanning in each direction are stored in a matrix. Accordingly, each matrix has two columns and a number of rows equal to the number of scans. Thus, when 100 scan lines are used each matrix has 100 rows. The data are processed by adding all the values in the first column and then dividing by the number of rows to obtain a first average column value. All the values of the second column are added and divided by the number of rows to obtain a second average column value. The two column values are then added and divided by two to yield a first average dimension value. The above data processing is repeated for the second data matrix to yield a second average dimension value. The two average dimension values are multiplied to obtain an average aperture area. Details of the data processing are described hereinafter in reference to FIGS. 3a, 3b and 3c.

Figure 2:
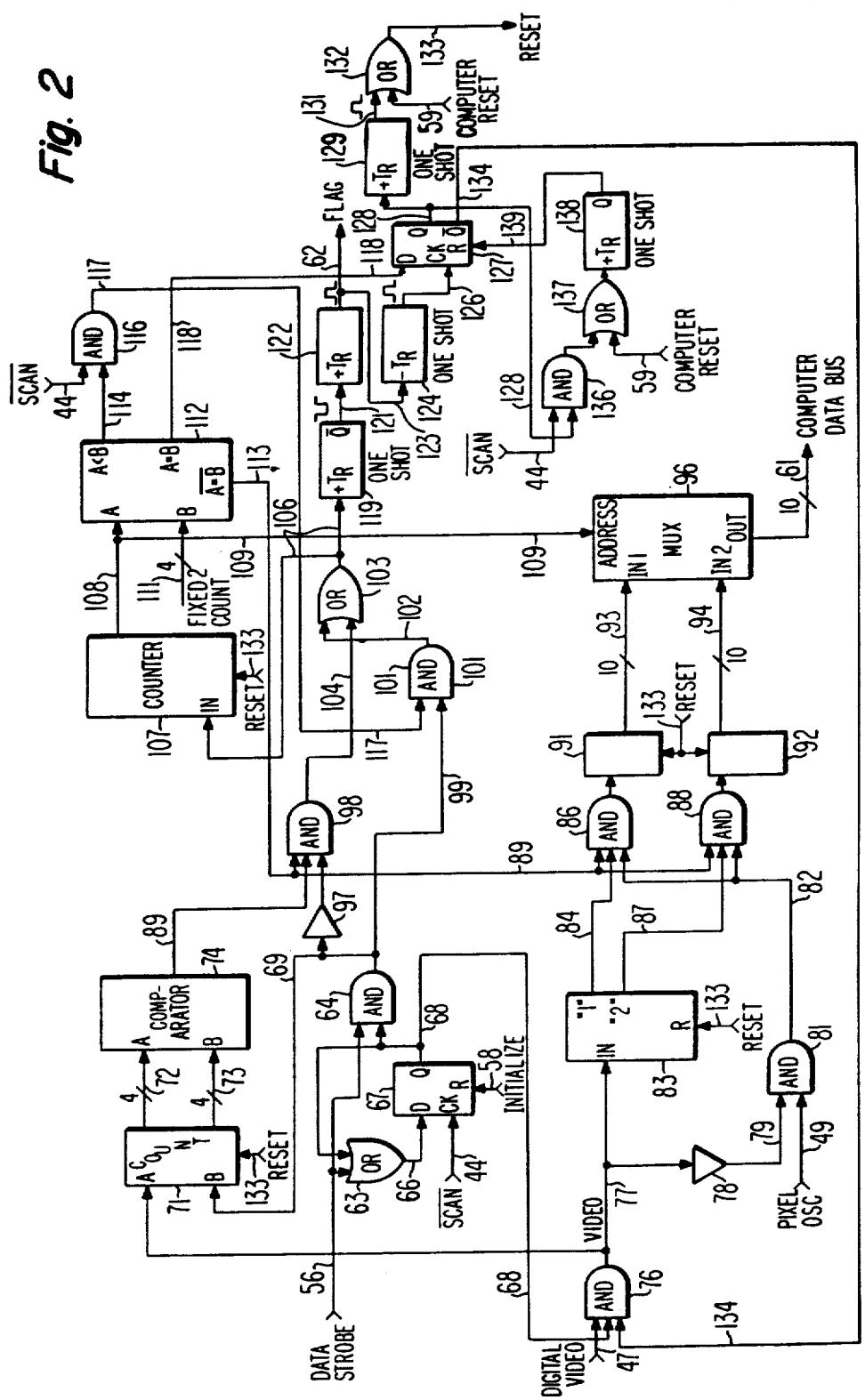
FIG. 2 is a logic diagram of an interface circuit used in the system of FIG. 1.

FIG. 2 is a preferred embodiment of the Reticon interface 46 of FIG. 1. The output line 58 of computer interface 51 provides an initialize signal to the reset input of a flip-flop 67 and the Q output on line 68 goes low. The computer interface 51 also provides a reset signal on line 59 to an OR gate 132. The output line 133 of the OR gate 132 is coupled to the reset input of the counters 71, 83, 91, 92 and 107 and the counters are reset. The computer reset signal is also applied to an OR gate 137 the output of which resets a D-type flip-flop 127 through a one-shot 138. The Q output of flip-flop 127 goes low and the $\overline{\text{Q}}$ output goes high. The computer 53 requests an array of data and the data strobe signal on lines 54 and 56 goes high. The data strobe signal on line 56 is input to an AND gate 64 and to the D-input of the flip-flop 67 through an OR gate 63 by line 66. The $\overline{\text{scan}}$ signal goes low and remains low during the scanning of the array. The clock input of the flip-flop 67 receives the $\overline{\text{scan}}$ signal on line 44, thus the Q-output of flip-flop 67 stays low until a scan line is finished. This is necessary because the data strobe signal is asynchronous with the $\overline{\text{scan}}$ signal. This prevents the data for the first scan from being taken from a partial digital video signal.

When the $\overline{\text{scan}}$ signal on line 44 goes high to establish an array blanking period. The Q output of flip-flop 67 on line 68 goes high and latches flip-flop 67 through OR gate 63 and also enables the AND gate 64. The Q output of flip-flop 67 on line 68 also enables an AND gate 76. The output of the AND gate 64 is coupled by a line 69 to the B input of a dual binary counter 71. Accordingly, the data strobe signals on line 56 pass through AND gate 64 to increment the B input of the counter 71 to a count of 1 and to also enable AND gate 101 via line 99. The "1" output of counter 83 on line 84 goes high to enable one input of AND gate 86. An output line 73 of counter 71 is coupled to the B input of a digital comparator 74. The A>B output of comparator 74 on line 89 stays low. When the first digital video is applied to an AND gate 76 by line 47, the output line 77 goes high and the A input of binary counter 71 increments to a count of 1. At this time, the A>B output of the comparator 74 one line 89 stays low. The first video signal on output line 77 of AND gate 76 also causes the "1" output of a counter 83 to go high. The video signal is delayed by a delay 78 and applied by line 79 to enable an AND gate 81. The pixel oscillator pulses on line 49 are then gated through the AND gate 81 to an output line 82 and to AND gates 86 and 88. The A=B output of a comparator 112 on a line 113 is high to enable AND gates 86, 88 and 98. Therefore, the AND gate 86 gates the pixel oscillator pulses to the counter 91 and the counter counts the number of pixels which resulted in the first digital signal. This number represents either the width or length, depending upon the orientation of camera 16, of the first slit being measured. The number is applied by a ten conductor cable 93 to multiplexer 96 and by output cable 61 to computer interface 51.

When the second digital video signal is applied to line 47, the "1" output of counter 83 on line 84 goes low and the "2" output on line 87 goes high. Accordingly, AND gate 86 is inhibited and AND gate 88 is enabled. The pixel oscillator signals on line 82 are gated through AND gate 88 to counter 92. The output cable 94 of counter 92 is coupled to the "2" input of multiplexer 96. The second digital video signal on line 77 also causes counter 71 to increment to a count of 2. At this time, the A>B output of comparator 74 on line 89 goes high and enable AND gate 98. The data strobe pulse on line 56 is gated by AND gate 64 and delay 97 to AND gate 98. The output of AND gate 98 on output line 104 increments counter 107 through OR gate 103 to a count of 1. The output of counter 107 is applied by line 108 to the A input of digital comparator 112 and by line 109 to the address input of multiplexer 96. The B input of comparator 112 is set at a fixed count of 2. Accordingly at this time, the outputs of comparator 112 on lines 114 and 118 do not change from the initial low state and line 113 remains high. The output of counter 107 on the line 108 is applied to multiplexer 96 to cause the ten-bit binary number from counter 91 to be output by the multiplexer to the computer interface data bus 61.

The data strobe output of AND gate 98 is gated through OR gate 103 which triggers a delay one-shot 119. This delay gives time for the data to settle on the computer bus line. The positive edge of the one-shot 119 output triggers a one-shot 122 which produces a flag signal to the computer on line 62. At this time, the Data Strobe signal goes low and the computer reads the data off the bus 61 through the computer interface 51. The output of one-shot 122 is applied to the −TR input of a one-shot 124 by line 123. The output line 126 of one shot 124 applies a clock pulse to a flip-flop 127. Since the A=B output of comparator 112 is still low, the D input of flip-flop 122 is low and the Q and $\overline{Q}$ outputs of flip-flop 127 do not change. The next data strobe signal on the line 56 is gated through AND gate 64 to increment the counter 71 B input to a count of 2. The third digital video signal has not occurred and the A>B output of comparator 74 on line 89 is low and AND gate 98 output remains low. The delay gate 97 delays the data strobe signal to AND Gate 98 to avoid edges. When the third data strobe signal occurs on the line 56, the A>B output of comparator 74 on line 89 goes high enabling AND gate 98. The output of counter 107 is incremented to a count of 2 which causes the multiplexer 96 to apply the output of counter 92 to data bus 94. The flag signal occurs as previously described and the computer reads the second value.

The A=B output of comparator 112 on line 118 is now high. Thus, when one-shot 124 triggers the flip-flop 127, the Q output goes high and the $\overline{Q}$ output goes low. The $\overline{Q}$ output is coupled by line 134 to an input of AND gate 76 so that the low disables AND gate 76 to prevent additional video pulses from being input to the system. The high Q output of flip-flop 127 triggers a one-shot 129 causing line 131 to go high and a reset pulse is produced by OR gate 132 on line 133. Thus at this time, the counter 71 is ready for the next data strobe signal. When the $\overline{\text{scan}}$ signal on line 44 goes high, and when the Q output of flip-flop 127 on line 128 is high, one-shot 138 is triggered by AND gate 136 and OR gate 137. The flip-flop 127 is thus reset and the $\overline{Q}$ output goes high to enable AND gate 76 over line 134. Thus, when the next $\overline{\text{scan}}$ low occurs, the digital video signals will be properly gated through the system to provide the next line of data to the computer 52.

In the event that less than 3 digital video signals occur during the scan, the A>B output of comparator 112 on line 114 is high to enable AND gate 116. When the scan signal on line 44 goes high during the blanking period of the array, the output of AND gate 116 on line 117 also goes high to cause the data strobe signal to be gated through AND gate 101 and OR gate 103 to increment counter 107 to produce a flag to the computer. When two data values are read, the A=B output of comparator 112 goes high and flip-flop 127 is clocked as previously described.

The Recticon interface logic circuit provides two ten-bit data values per scan which represent the width and length of two slits. In the event that there are only two slits in the field of view during a single scan, both values are sent to the computer. In the event that only one slit is in the field of view, the first value will be sent along with zeros for the second value. In the event no slits are in the field of view, zeroes will be sent for both values. In any event, two data values per scan are transferred to the computer.

The data are received by the computer and stored in a matrix of rows and columns for each dimensional measurement. For example:

| MATRIX 1 (e.g. a width measurement) | | | |
|---|---|---|---|
| | Column 1 | Column 2 | |
| Row 1 | 100 | 105 | Scan 1 |
| Row 2 | 102 | 110 | Scan 2 |
| Row 3 | 105 | 107 | Scan 3 |
| . | . | . | . |
| . | . | . | . |
| Row 100 | 105 | 100 | Scan 100 |
| | TOTAL COUNT 1 | TOTAL COUNT 2 | |

A total size value is selected in accordance with the number of scans. Thus, when 100 scans are used, the total size value is 100.

The data are processed by reading every value in Column 1. The largest value is recorded and identified as HVAL. Every Column 1 value is individually compared to HVAL. When the difference is >20, $\phi\phi$ is placed into the column for this value and the total size value is reduced by 1. When the initial total size value is 100 and there is one $\phi$ in the column, the value is reduced to 99. There are two reasons for this comparison. In actuality, the slits are rounded in the corners because perfectly rectangular apertures are very difficult to produce by acid etching. By comparing the readings to a high value, the scans near the rounded corners are discounted. Also if a zero is originally in the matrix, the total size must be reduced for correct averaging. After every value in the column is compared to HVAL, the values are added to obtain a total count; e.g., $100+102+105+\ldots+103=$ total count. The total count is then divided by the reduced total size value to yield an average count for the column: Total count/size value=average count.

The above averaging is repeated for column 2. The camera is then rotated 90° and the scanning and averaging repeated for the orthogonal dimension. After the scanning and averaging are completed for each dimension, data are available for the slits within the shadow mask:

Width 1=Average Count 1=C11
Width 2=Average Count 2=C12
Length 1=Average Count 1=C21
Length 2=Average Count 2=C22

Each pixel represents 0.06 mils and average dimensions are thus obtainable:

$$\frac{C11 + C12}{2} \times (.06) = \text{Average slit Width} = ASW$$

$$\frac{C21 + C22}{2} \times (.06) = \text{Average slit Length} = ASL$$

The average area therefore is:

Length × Width = Area

ASW × ASL = Average Area in square mils = AAC

The shadow mask 12 (FIG. 1) can be moved to various positions with respect to the camera 16 and the averaging repeated to obtain a representative sample of the aperture area.

Figure 3A:
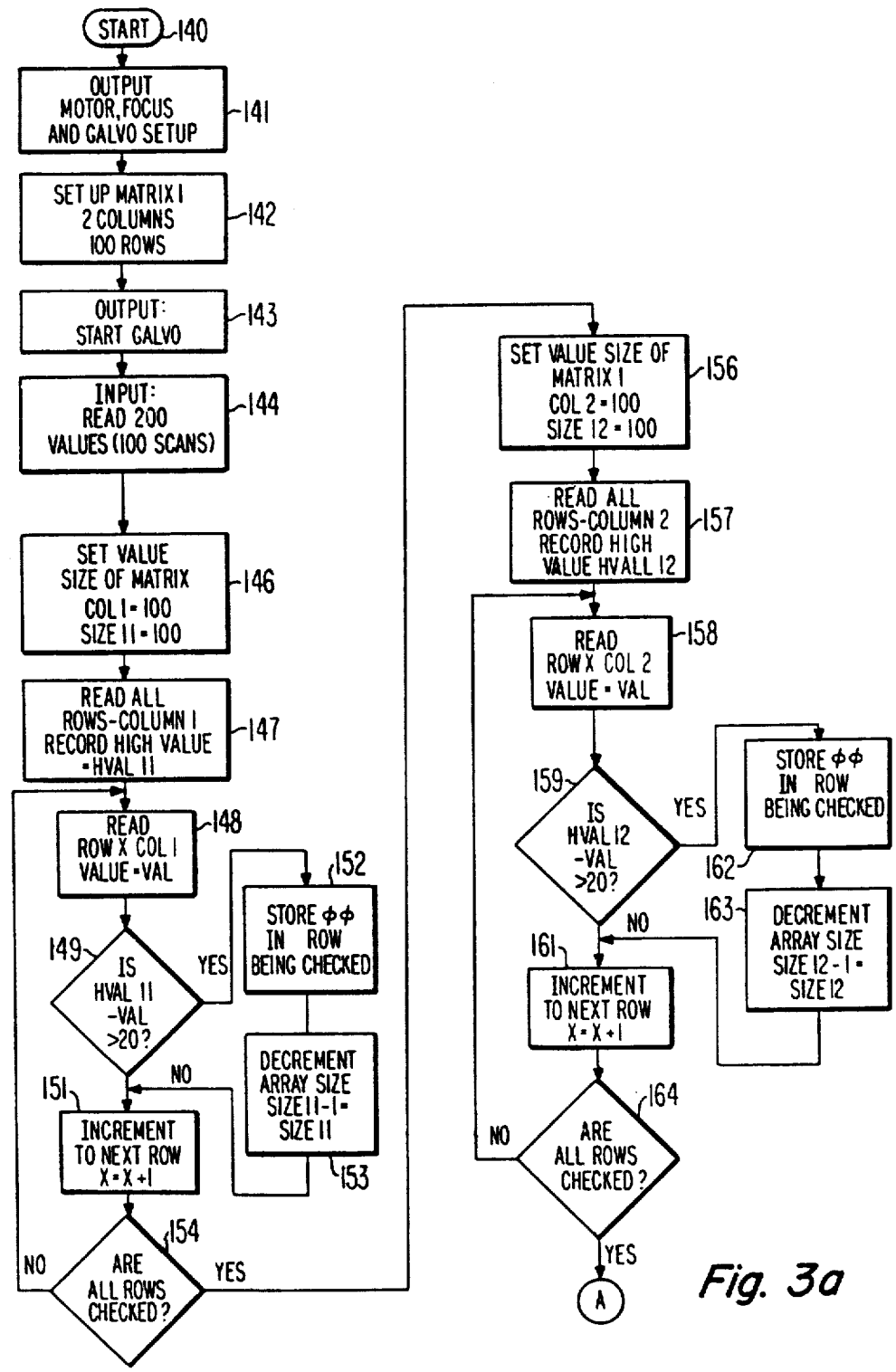
FIGS. 3a, 3b and 3c constitute a flow chart of a preferred embodiment of a system for calculating the average area of slits in an opaque medium.
Figure 3B:
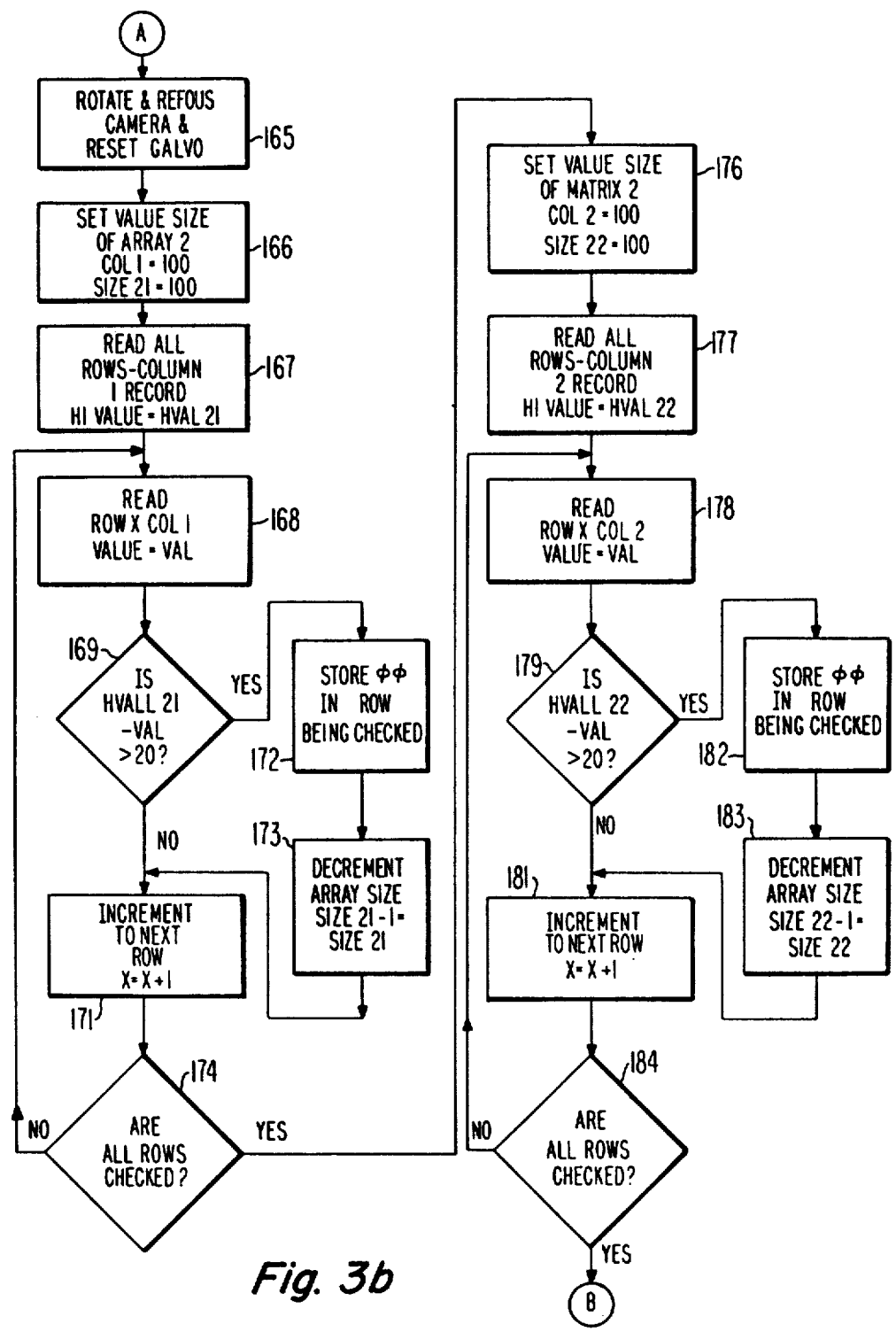
Figure 3C:
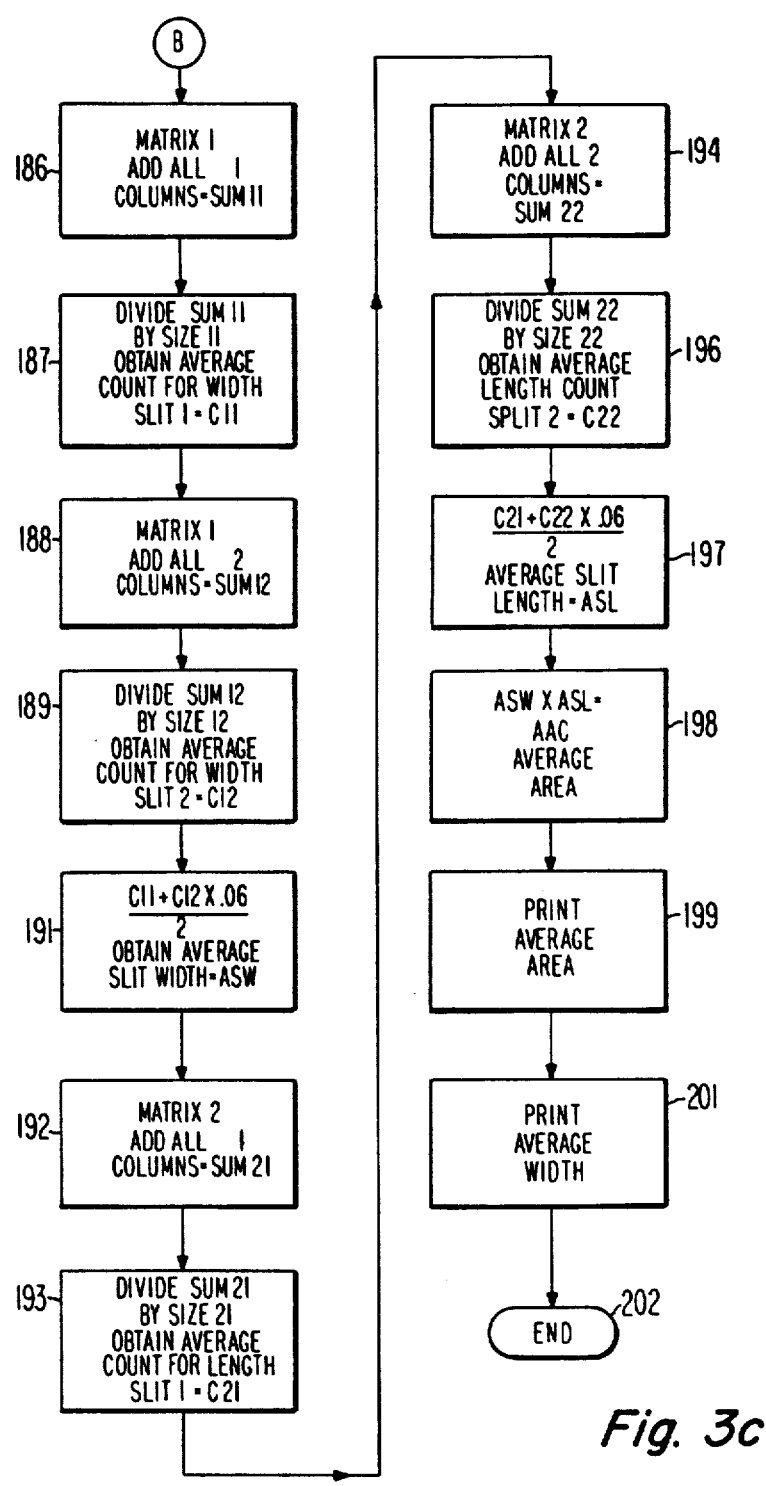

FIGS. 3a, 3b and 3c are a flow chart of a preferred embodiment of a system for averaging the data in the manner described hereinabove. The shadow mask 12 (FIG. 1) is placed between the light source 11 and the camera 16 and the averaging process starts functional at block 140. At functional block 141, the camera is focused and rotated if necessary and the galvo mirror 19 is returned to its initial position. At functional block 142 the first matrix of two columns and 100 rows is set up. At functional block 143, an output is provided to the galvo mirror 19 to begin scanning. At functional block 144, data are provided for 200 aperture values at a rate of 2 values for each of 100 scans, for example. At functional block 146, the total size value is set in accordance with the number of scans. Thus, for example, when 100 scan lines is used, the value is set at 100. At functional block 147, the system is initiated to the first matrix row and the values for one column are read to record the highest value as the HVAL 11 value. At functional block 148, the value of column 1, row 1, is read. At functional block 149, the value of the row 1 column 1 is compared with the HVAL value to determine whether the difference is greater than 20. When it is not, functional block 151 is proceeded to increment to the next value in the column. When the difference between HVAL and the row value is greater than 20, functional block 152 is entered to store φφ in the row position for that column. Functional block 153 is then entered and the total size value set into the system at functional block 146 is decreased by one. Functional block 151 is then entered to increment to the next value in the column. Functional block 154 is then entered to determine whether all the values in a column have been checked. When they have not, functional block 148 is reentered, the matrix is incremented to the next row and the comparison process is repeated. When all values within a column have been checked, functional block 156 is entered to set the total size value for the second column of data. The system is initiated to the first row of the second column and the comparison process for all the row values within the second column is then repeated in functional blocks 157 through 164.

After all the values in the second column of the matrix are compared, the camera is rotated 90°, refocused and the galvo set up to begin scanning for the orthogonal dimension of the apertures at functional block 165 (FIG. 3b). The second matrix is set up in two columns of 100 rows, an order to read 200 values is provided and the comparison process for all the values within the two columns of data in the second matrix are then compared in functional steps 166 through 184.

At functional block 186 (FIG. 3c) all the values in the first column of data are added and at functional block 187, the sum is divided by the final total size value to obtain the average pixel count value for the first dimension measured. At functional blocks 188 and 189, the average width count for the second column of data is obtained. At functional block 191, the two averaged width pixel counts are added and divided by two and multiplied by 0.06 to obtain an average slit width ASW.

At functional blocks 192 through 197, the average dimension for the other dimension, e.g. the length ASL is obtained. Functional block 198 is then entered to multiply the two average dimensions to obtain an average area. Functional block 199 is then entered to print, or otherwise display, the average slit area. Functional block 201 is then entered to print, or otherwise display the average slit width. The process ends at 202. If desired, the position of the shadow mask with respect to the camera can be changed and the process repeated a plurality of times to obtain a representative area of the apertures within the shadow mask.

Figure 4A:
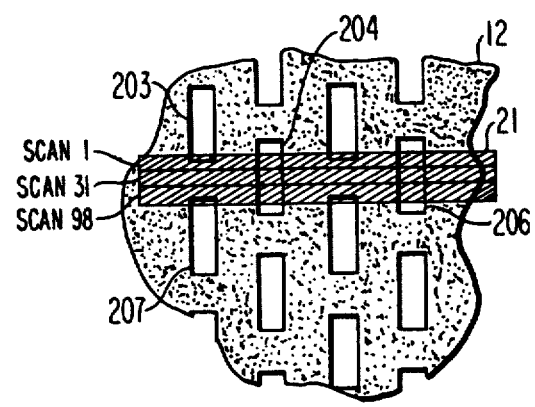
FIGS. 4a and 4b depict sections of a shadow mask to show how the widths and lengths of rectangular apertures are measured.

FIG. 4a shows a broken away portion of the shadow mask 12 and the diode array 21 and is useful in undertanding how all of the data in a given data matrix do not necessarily come from the same two apertures in the shadow mask. The data, therefore, are more representative of the average aperture area than if the same two apertures were used. The apertures are shown as rectangles with square corners. In reality, the corners are slightly rounded because it is difficult to etch square corners. The use of the HVAL described hereinabove eliminates any error which otherwise would be caused by such corners. In FIG. 4a, scan line 1, with scanning proceeding from left to right, data from apertures 203 and 204 will be included in the matrix. However, in scan line 31, aperture 203 is out of view and data will be provided to the matrix from apertures 204 and 206. Similarly, in scan line 98 the first two apertures encountered are 207 and 204. Accordingly, the data within the first matrix will be received from apertures 203, 204, 206 and 207.

Figure 4B:
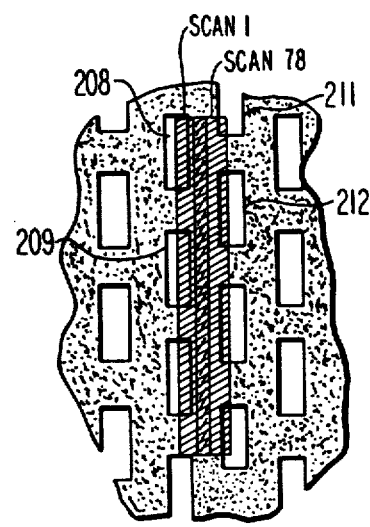

FIG. 4b is similar to FIG. 4a when the length of the apertures is being measured. This FIGURE shows how the data in the matrix will be received from apertures 208, 209, 211 and 212.

What is claimed is:

1. An interface circuit for providing a selected two pulses of a pulse train to a computer comprising:
   gate means responsive to said pulse train and to enable signals for providing output pulses;
   means responsive to said output pulses for providing data inputs to a computer when said gate means is enabled;
   first logic means responsive to data strobe signals and to $\overline{\text{scan}}$ signals for providing a first enable signal to said gate means;
   counter means responsive to said data strobe signals for providing count output pulses in response to said data strobe signals;
   comparator means responsive to said count output pulses, said comparator means having a first input terminal for receiving said count output pulses and a second input terminal for receiving a fixed 2 count, said comparator means having a control output terminal and providing a control pulse when the input signals to said first and second input terminals are equal whereby said control pulse is provided in response to the second of said data strobe signals; and
   second logic means responsive to said control output terminal, the output of said second logic means being coupled to an input terminal of said gate means whereby said second logic means normally enables said gate means and inhibits said gate means in response to said control pulse.

2. The interface circuit of claim 1 wherein said gate means includes an AND gate.

3. The interface circuit of claim 2 wherein said second logic means includes a D-type flip-flop.

4. The interface circuit of claim 3 wherein said comparator is a digital comparator.

* * * * *